United States Patent
Sendai et al.

(10) Patent No.: US 9,972,319 B2
(45) Date of Patent: May 15, 2018

(54) DISPLAY DEVICE, METHOD OF CONTROLLING DISPLAY DEVICE, AND PROGRAM HAVING DISPLAY OF VOICE AND OTHER DATA

(71) Applicant: SEIKO EPSON CORPORATION, Tokyo (JP)

(72) Inventors: Kaori Sendai, Okaya (JP); Atsunari Tsuda, Suwa (JP); Masahide Takano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days. days.

(21) Appl. No.: 14/720,258

(22) Filed: May 22, 2015

(65) Prior Publication Data

US 2016/0035351 A1 Feb. 4, 2016

(30) Foreign Application Priority Data

Jul. 31, 2014 (JP) ................................ 2014-156645

(51) Int. Cl.
*G10L 15/24* (2013.01)
*G02B 27/01* (2006.01)
*G10L 15/26* (2006.01)
*G10L 15/22* (2006.01)

(52) U.S. Cl.
CPC ............ *G10L 15/24* (2013.01); *G02B 27/017* (2013.01); *G02B 2027/014* (2013.01); *G02B 2027/0178* (2013.01); *G10L 15/26* (2013.01); *G10L 2015/221* (2013.01)

(58) Field of Classification Search
CPC ............ G02B 27/017; G02B 2027/014; G02B 2027/0178; G10L 15/26; G10L 15/24; G10L 2015/221
See application file for complete search history.

(56) References Cited

U.S. PATENT DOCUMENTS

| | | | | |
|---|---|---|---|---|
| 7,221,405 B2 * | 5/2007 | Basson | .................. | G09B 19/08 345/7 |
| 8,209,183 B1 * | 6/2012 | Patel | ........................ | G06K 9/72 382/181 |
| 8,965,460 B1 * | 2/2015 | Rao | .......................... | G06F 3/005 455/566 |
| 9,111,522 B1 * | 8/2015 | Worley, III | ............ | G10K 11/16 |
| 9,292,082 B1 * | 3/2016 | Patel | .................... | G02B 27/017 |

(Continued)

FOREIGN PATENT DOCUMENTS

| | | |
|---|---|---|
| JP | 2011-221236 A | 11/2011 |
| JP | 2012-059121 A | 3/2012 |

(Continued)

*Primary Examiner* — Walter Yehl
(74) *Attorney, Agent, or Firm* — Oliff PLC

(57) ABSTRACT

A head mounted display device includes an image display unit that allows a user to visually recognize an image and through which outside scenery is transmitted and a microphone that detects a voice. In addition, the head mounted display device further includes a data acquisition unit that acquires data and an additional data display control unit that allows the image display unit to display an image based on the voice detected by the microphone and the data acquired by the data acquisition unit when the outside scenery is visually recognized by the user through the image display unit.

14 Claims, 9 Drawing Sheets

(56) References Cited

U.S. PATENT DOCUMENTS

| | | | | |
|---|---|---|---|---|
| 2002/0158816 | A1* | 10/2002 | Snider | G09G 3/001 |
| | | | | 345/8 |
| 2006/0103591 | A1* | 5/2006 | Tanimura | G06F 1/3218 |
| | | | | 345/8 |
| 2011/0043652 | A1* | 2/2011 | King | G06F 17/2211 |
| | | | | 348/222.1 |
| 2011/0221671 | A1* | 9/2011 | King, III | G02B 27/017 |
| | | | | 345/156 |
| 2011/0248905 | A1 | 10/2011 | Chosokabe et al. | |
| 2012/0078628 | A1* | 3/2012 | Ghulman | G06F 3/14 |
| | | | | 704/235 |
| 2012/0330659 | A1 | 12/2012 | Nakadai | |
| 2013/0094682 | A1* | 4/2013 | Lee | G02B 27/01 |
| | | | | 381/306 |
| 2013/0208234 | A1* | 8/2013 | Lewis | G06F 3/011 |
| | | | | 351/158 |
| 2014/0022284 | A1 | 1/2014 | Chosokabe et al. | |
| 2014/0081634 | A1* | 3/2014 | Forutanpour | G06F 17/289 |
| | | | | 704/235 |
| 2015/0029094 | A1* | 1/2015 | Aronsson | G01C 21/3679 |
| | | | | 345/156 |
| 2015/0206321 | A1* | 7/2015 | Scavezze | G06T 7/20 |
| | | | | 345/633 |
| 2015/0326704 | A1* | 11/2015 | Ko | H04M 1/7253 |
| | | | | 455/456.3 |
| 2016/0034251 | A1* | 2/2016 | Sendai | G06F 3/167 |
| | | | | 345/156 |
| 2016/0035136 | A1* | 2/2016 | Sendai | G02B 27/0172 |
| | | | | 345/633 |
| 2016/0035137 | A1* | 2/2016 | Sendai | G02B 27/017 |
| | | | | 345/633 |
| 2016/0084937 | A1* | 3/2016 | Lin | G01S 5/20 |
| | | | | 367/13 |

FOREIGN PATENT DOCUMENTS

| | | |
|---|---|---|
| JP | 2013-008031 A | 1/2013 |
| JP | 2013-172411 A | 9/2013 |
| JP | 2014-056217 A | 3/2014 |
| JP | 2016127463 A * | 7/2016 |

* cited by examiner

DISPLAY DEVICE, METHOD OF CONTROLLING DISPLAY DEVICE, AND PROGRAM HAVING DISPLAY OF VOICE AND OTHER DATA

BACKGROUND

1. Technical Field

The present invention relates to a display device, a method of controlling a display device, and a program.

2. Related Art

In the related art, as a display device, a wearable display device having a function of displaying sentences is known (see JP-A-2014-56217). The device disclosed in JP-A-2014-56217 changes display attributes such as the font size or the color of characters of some characters or words in sentence data such that a user can easily grasp the contents of displayed sentence data. Accordingly, the device readably displays, for example, the sentence in a microblog.

In the device disclosed in JP-A-2014-56217, the display attributes are changed corresponding to the contents of information to be displayed such that the font size or the like of words expressing a specific field is increased. Meanwhile, in the related art, there has been no technique of performing display corresponding to external circumstances of the device or the user that uses the device.

SUMMARY

An advantage of some aspects of the invention is to provide a display device that displays information corresponding to external factors outside of the device, a method of controlling a display device, and a program.

An aspect of the invention is directed to a display device including: a display unit through which outside scenery is transmitted and that allows a user to visually recognize an image together with the outside scenery; a voice detection unit that detects a voice; a data acquisition unit that acquires data; and a control unit that allows the display unit to display an image based on the voice detected by the voice detection unit and the data acquired by the data acquisition unit.

According to the aspect of the invention, since the data is displayed in consideration of the state of the voice or the contents thereof, it is possible to display information corresponding to the external factors outside the display device.

In the display device, the control unit may acquire information related to the outside scenery visually recognized through the display unit and allows the display unit to display an image based on the acquired information.

According to the aspect of the invention with this configuration, it is possible to display an image corresponding to the outside scenery visually recognized by the user.

In the display device, the control unit may acquire information related to the outside scenery visually recognized through the display unit based on the voice detected by the voice detection unit.

According to the aspect of the invention with this configuration, it is possible to easily obtain information related to the outside scenery visually recognized by the user based on the voice.

The display device may further include an imaging unit and the control unit acquires information related to the outside scenery visually recognized through the display unit from a captured image of the imaging unit.

According to the aspect of the invention with this configuration, it is possible to easily obtain information related to the outside scenery visually recognized by the user based on the captured image.

In the display device, the control unit may detect an image of a speaking person from the captured image of the imaging unit, extract the voice of the speaking person from the voices detected by the voice detection unit based on the detected image, and allow the display unit to display an image based on the extracted voice and the data acquired by the data acquisition unit.

According to the aspect of the invention with this configuration, it is possible to specify a person who uttered a voice by detecting the voice without using a microphone or the like.

In the display device, the control unit may allow the display unit to display the data acquired by the data acquisition unit in a display mode corresponding to the voice detected by the voice detection unit.

According to the aspect of the invention with this configuration, it is possible to detect the voice and display the data in the display mode corresponding to the voice so as to be seen by the user.

In the display device, the control unit may allow the display unit to display data corresponding to the voice detected by the voice detection unit from among data acquired by the data acquisition unit.

According to the aspect of the invention with this configuration, it is possible to display, for example, data related to the detected voice. In a case where the voice detected by the voice detection unit is heard by the user, it is possible to perform display presentation corresponding to the voice by displaying the data corresponding to the voice and to provide the information related to the voice for the user.

In the display device, the control unit may allow the display unit to display characters based on the data acquired by the data acquisition unit.

According to the aspect of the invention with this configuration, the characters are displayed based on the voice outside of the display device. In this manner, it is possible to provide information related to the voice using the characters.

In the display device, the characters corresponding to the voice detected by the voice detection unit may be displayed in a mode which is different from other characters.

According to the aspect of the invention with this configuration, for example, it is possible to make the characters stand out corresponding to the voice and to provide information related to the voice so as to be easily seen by the user using the characters. In addition, the characters corresponding to the voice and other characters in different modes can be seen by the user. Accordingly, it is possible to provide more information by displaying the information and to make the information stand out.

In the display device, the control unit may specify a kind of language of the voice detected by the voice detection unit and allow the display unit to display characters of the specified language.

According to the aspect of the invention with this configuration, the voice is detected and the characters are displayed in a language of the detected voice. In this manner, it is possible to provide information using the voice and the characters of the same language.

In the display device, the control unit may allow the display unit to display the characters of the specified language and characters of a set language.

According to the aspect of the invention with this configuration, since the characters of the language of the detected voice are displayed and the characters of a set language are displayed, it is possible to provide specific information in multiple languages.

The display device may further include a language conversion unit that converts characters included in the data acquired by the data acquisition unit to characters of a language to be displayed.

According to the aspect of the invention with this configuration, since the characters of a language different from the language to be displayed are converted and then displayed, it is possible to provide information for the user even in a case where data including characters of multiple languages is acquired.

In the display device, character data of recognition results may be output by performing voice recognition of the voice detected by the voice detection unit.

According to the aspect of the invention with this configuration, it is possible to display the contents of the voice.

Another aspect of the invention is directed to a method of controlling a display device which includes a display unit through which outside scenery is transmitted and that displays an image so as to be visually recognized together with the outside scenery, the method including: detecting a voice uttered from a visual line direction of a user; acquiring data; and allowing the display unit to display an image based on the detected voice and the acquired data.

According to the aspect of the invention, since the data is displayed in consideration of the state of the voice or the contents thereof, it is possible to display information corresponding to the external factors outside of the display device.

Still another aspect of the invention is directed to a program which can be executed by a computer controlling a display device which includes a display unit through which outside scenery is transmitted and that displays an image so as to be visually recognized together with the outside scenery, the program causing the computer to function as: a control unit that detects a voice uttered from a visual line direction of a user, acquires data, and allows the display unit to display an image based on the detected voice and the acquired data.

According to the aspect of the invention, since the data is displayed in consideration of the state of the voice or the contents thereof, it is possible to display information corresponding to the external factors outside of the display device.

BRIEF DESCRIPTION OF THE DRAWINGS

The invention will be described with reference to the accompanying drawings, wherein like numbers reference like elements.

FIG. 8A is a view schematically illustrating a configuration of a theater in which the head mounted display device is used and FIG. 8B illustrates an example of the field of vision of a user that uses the head mounted display device in the theater.

FIG. 9A illustrates a display example of displaying text and FIG. 9B illustrates another display example of the image display unit.

DESCRIPTION OF EXEMPLARY EMBODIMENTS

Figure 1:
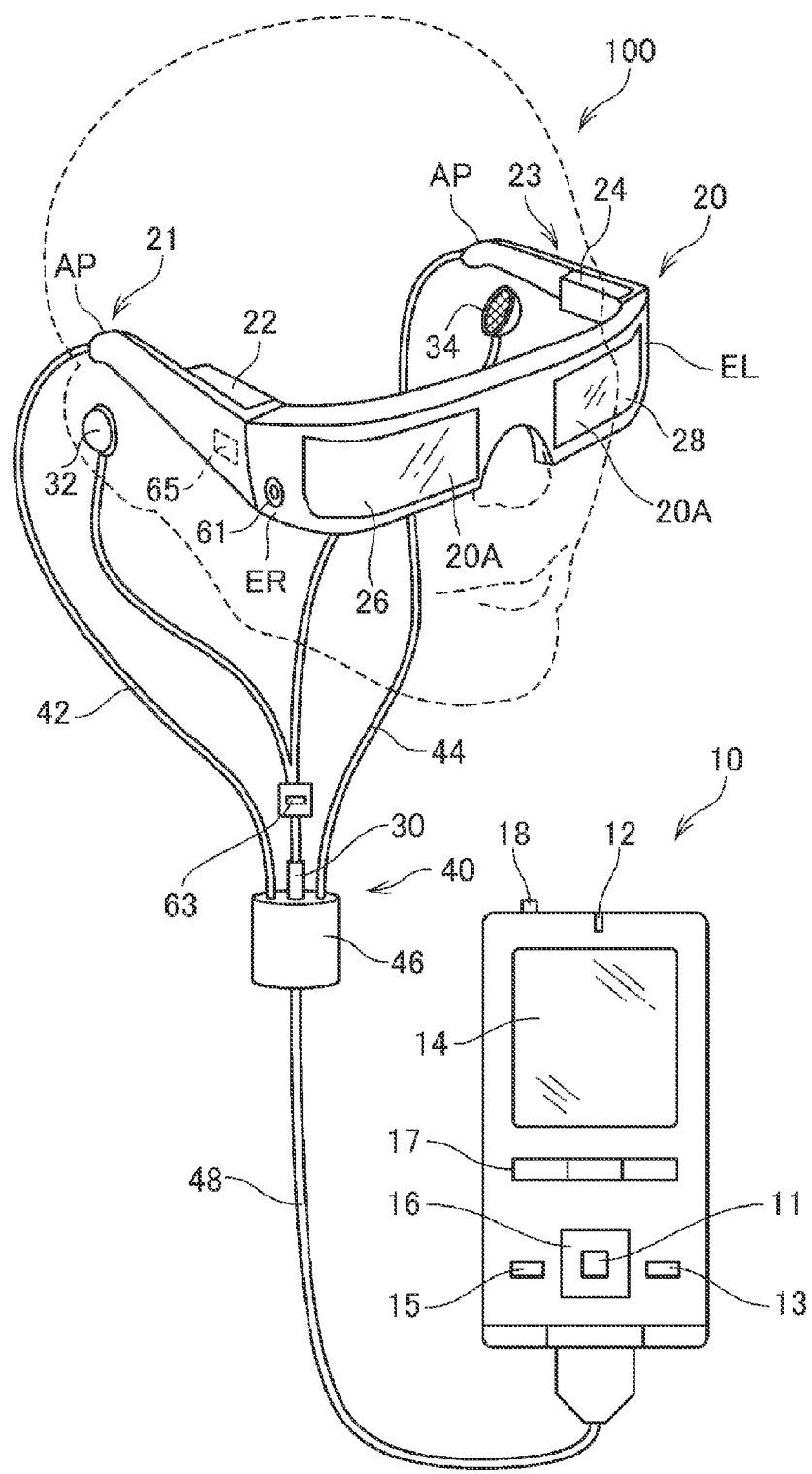
FIG. 1 is a view illustrating an external configuration of a head mounted display device.

FIG. 1 is an explanatory view illustrating an external configuration of a head mounted display device 100. The head mounted display device 100 is a display device that is mounted on a head and referred to as a head mounted display (HMD). The head mounted display device 100 according to the present embodiment is an optical transmission type head mounted display device in which the outside scenery can be directly visually recognized at the same time as when a virtual image is visually recognized by a user. Further, in the present specification, the virtual image visually recognized by the user using the head mounted display device 100 is conveniently referred to as a "display image." Further, emitting image light generated based on image data is expressed as "displaying an image."

The head mounted display device 100 includes an image display unit 20 that allows the user to visually recognize a virtual image in a state in which the head mounted display device is mounted on the head of the user and a control device 10 that controls the image display unit 20. The control device 10 functions as a controller used for the user to operate the head mounted display device 100. The image display unit 20 is also simply referred to as a "display unit."

The image display unit 20 is a mounted body to be mounted on the head of the user and has a shape of glasses in the present embodiment. The image display unit 20 includes a right holding unit 21, a right display driving unit 22, a left holding unit 23, a left display driving unit 24, a right optical image display unit 26, a left optical image display unit 28, a camera 61 (imaging unit), and a microphone 63. The right optical image display unit 26 and the left optical image display unit 28 are respectively arranged so as to be positioned in front of right and left eyes of the user when the image display unit 20 is mounted on the head of the user. One end of the right optical image display unit 26 and one end of the left optical image display unit 28 are connected to each other in a position corresponding to a place between eyebrows of the user when the image display unit 20 is mounted on the head of the user.

The right holding unit 21 is a member provided in a state of being extended from an end portion ER which is the other end of the right optical image display unit 26 to a position corresponding to a side head portion of the user when the image display unit 20 is mounted on the head of the user. Similarly, the left holding unit 23 is a member provided in a state of being extended from an end portion EL which is the other end of the left optical image display unit 28 to a position corresponding to a side head portion of the user when the image display unit 20 is mounted on the head of the user. The right holding unit 21 and the left holding unit 23 hold the image display unit 20 on the head portion of the user in a shape of temples (bows) of glasses.

The right display driving unit 22 and the left display driving unit 24 are arranged on the side facing the head portion of the user when the image display unit 20 is mounted on the user. Hereinafter, the right holding unit 21 and the left holding unit 23 are simply and collectively referred to as "holding units," the right display driving unit and the left display driving unit 24 are simply and collectively referred to as "display driving units," and the right optical image display unit 26 and the left optical image display unit 28 are simply and collectively referred to as "optical image display units."

The display driving units 22 and 24 include liquid crystal displays 241 and 242 (hereinafter, also referred to as "LCDs 241 and 242") or projection optical systems 251 and 252 (see FIG. 2). The details of the configurations of the display driving units 22 and 24 will be described below. The optical image display units 26 and 28 serving as optical members include light guide plates 261 and 262 (see FIG. 2) and a light adjusting plate 20A. The light guide plates 261 and 262 are formed of a resin with optical transparency or the like and guide image light output from the display driving units 22 and 24 to the eyes of the user. The light adjusting plate 20A is a thin plate-like optical element and is arranged so as to cover the front side of the image display unit 20 which is the opposite side of the eyes of the user. As the light adjusting plate 20A, various plates such as a plate with substantially no optical transparency, a nearly transparent plate, a plate through which light is transmitted by attenuating the amount of light, and a plate that attenuates or reflects light with a specific wavelength can be used. By suitably selecting optical characteristics (optical transmittance and the like) of the light adjusting plate 20A, the amount of external light which is incident to the right optical image display unit 26 and the left optical image display unit 28 from the outside is adjusted and thus ease of visual recognition of a virtual image can be adjusted. In the present embodiment, a case in which the light adjusting plate 20A having optical transparency at least to the extent that the outside scenery can be visually recognized by the user on which the head mounted display device 100 is mounted is used is described. The light adjusting plate 20A protects the right light guide plate 261 and the left light guide plate 262 so that damage of the right light guide plate 261 and the left light guide plate 262 and adhesion of dirt thereto are suppressed.

The light adjusting plate 20A can be detachably attached to the right optical image display unit 26 and the left optical image display unit 28, plural kinds of light adjusting plates 20A are replaceable and can be mounted, or the light adjusting plate may be omitted.

The camera 61 is arranged in the end portion ER which is the other end of the right optical image display unit 26. The camera 61 images the outside scenery which is the outside view in a direction on the opposite side of the eyes of the user and acquires an image of the outside scenery. The camera 61 of the present embodiment illustrated in FIG. 1 is a single-lens camera, but may be a stereo camera.

An imaging direction, that is, the angle of view of the camera 61 is a front side direction of the head mounted display device 100, in other words, a direction in which at least a part of the outside scenery in the visual field direction of the user is imaged in a state of the head mounted display device 100 being mounted on the user. Further, the range of the angle of view of the camera 61 can be suitably set, but it is preferable that the imaging range of the camera 61 is a range including the outside world that is visually recognized by the user through the right optical image display unit 26 and the left optical image display unit 28. Further, it is more preferable that the imaging range of the camera 61 is set such that the entire visual field of the user through the light adjusting plate 20A can be imaged.

The image display unit 20 further includes a connecting unit 40 that connects the image display unit 20 with the control device 10. The connecting unit 40 includes a main cord 48 connected to the control device 10, a right cord 42, a left cord 44, and a coupling member 46. The right cord 42 and the left cord 44 are cords in which the main cord 48 is branched into two cords. The right cord 42 is inserted into a housing of the right holding unit 21 from the tip portion AP of the right holding unit 21 in the extension direction and connected to the right display driving unit 22. Similarly, the left cord 44 is inserted into a housing of the left holding unit 23 from the tip portion AP of the left holding unit 23 in the extension direction and connected to the left display driving unit 24.

The coupling member 46 is provided in a branch point of the main cord 48, the right cord 42, and the left cord 44 and has a jack that connects an earphone plug 30. A right earphone 32 and a left earphone 34 are extended from the earphone plug 30. The microphone 63 is provided in the vicinity of the earphone plug 30. The cords are combined into one cord from the earphone plug 30 to the microphone 63, branched from the microphone 63, and respectively connected to the right earphone 32 and the left earphone 34.

The specific specification of the microphone 63 is optional, but a configuration in which the microphone 63 has directivity will be described in the present embodiment. Examples of the directivity include cardioid, supercardioid, hypercardioid, and ultracardioid, and the directivity of the microphone 63 maybe any one of the examples. The directivity of the microphone 63 may be suitably selected in accordance with the degree of directivity required for the head mounted display device 100.

The microphone 63 having directivity particularly excellently collects and detects the voice from the visual line direction of the user on which the head mounted display device 100 is mounted. The microphone 63 or a component accommodating the microphone 63 may have structural characteristics in order to secure the directivity of the microphone 63. For example, in the example of FIG. 1, the microphone 63 and the coupling member 46 may be designed such that a sound collecting unit of the microphone 63 is directed to the visual line direction of the user in a state of the user on which the right earphone 32 and the left earphone 34 are mounted. Alternatively, the microphone 63 may be disposed by being embedded in the right holding unit 21 or the left holding unit 23. In this case, when a hole for collecting sound is formed on the front surface side of the right holding unit 21 or the left holding unit 23, that is, a surface which is located parallel to the right optical image display unit 26 and the left optical image display unit 28, the microphone can have directivity corresponding to the visual line direction of the user. The visual line direction of the user is, in other words, a direction in which the right optical image display unit 26 and the left optical image display unit 28 face, a direction toward the center of the visual field which is seen by the user over the right optical image display unit 26 and the left optical image display unit 28, or an imaging direction of the camera 61. In addition, the direction of the directivity of the microphone 63 may vary. In this case, the microphone may have a configuration in which the visual line direction of the user is detected and the visual line direction of the microphone 63 is adjusted so as to face the direction.

In addition, the right cord 42 and the left cord 44 can be combined into one cord. A conductive wire in the inside of the right cord 42 is drawn into the left holding unit 23 side through the inside of the main body of the image display unit 20 and coated with a resin together with a conductive wire in the inside of the left cord 44, and both cords may be combined into one cord.

The image display unit 20 and the control device 10 transmit various signals through the connecting unit 40. The end portion on the opposite side of the coupling member 46 in the main cord 48 and the control device 10 are respectively provided with connectors (not illustrated) engaged with each other. The control device 10 and the image display unit 20 are connected with each other or separated from each other due to engagement or disengagement of the connector of the main cord 48 and the connector of the control device 10. For example, metal cables or optical fibers can be applied to the right cord 42, the left cord 44, and the main cord 48.

The control device 10 is a device that controls the head mounted display device 100. The control device 10 includes switches having a determination key 11, a lighting unit 12, a display switching key 13, a brightness switching key 15, a direction key 16, a menu key 17, and a power supply switch 18. Further, the control device 10 includes a trackpad 14 that is manipulated by a touch operation of the user using a finger.

The determination key 11 outputs a signal that detects a pressing operation and determines the content operated by the control device 10. The lighting unit 12 notifies an operation state of the head mounted display device 100 according to the light emission state thereof. As the operation state of the head mounted display device 100, an On or Off state of the power supply can be exemplified. For example, a light emitting diode (LED) is used as the lighting unit 12. The display switching key 13 detects the pressing operation and outputs a signal that switches the display mode of a content video with 3D or 2D.

The trackpad 14 detects the operation of the user using a finger of the user on the operation surface of the trackpad 14 and outputs a signal according to the detected contents. As the trackpad 14, various trackpads such as an electrostatic trackpad, a pressure detecting trackpad, and an optical trackpad can be employed. The brightness switching key 15 detects a pressing operation and outputs a signal that increases or decreases the brightness of the image display unit 20. The direction key 16 detects the pressing operation on the key corresponding to the vertical direction and the horizontal direction and outputs a signal according to the detected contents. The power supply switch 18 switches the power supply state of the head mounted display device 100 by detecting a slide operation of the switch.

Figure 2:
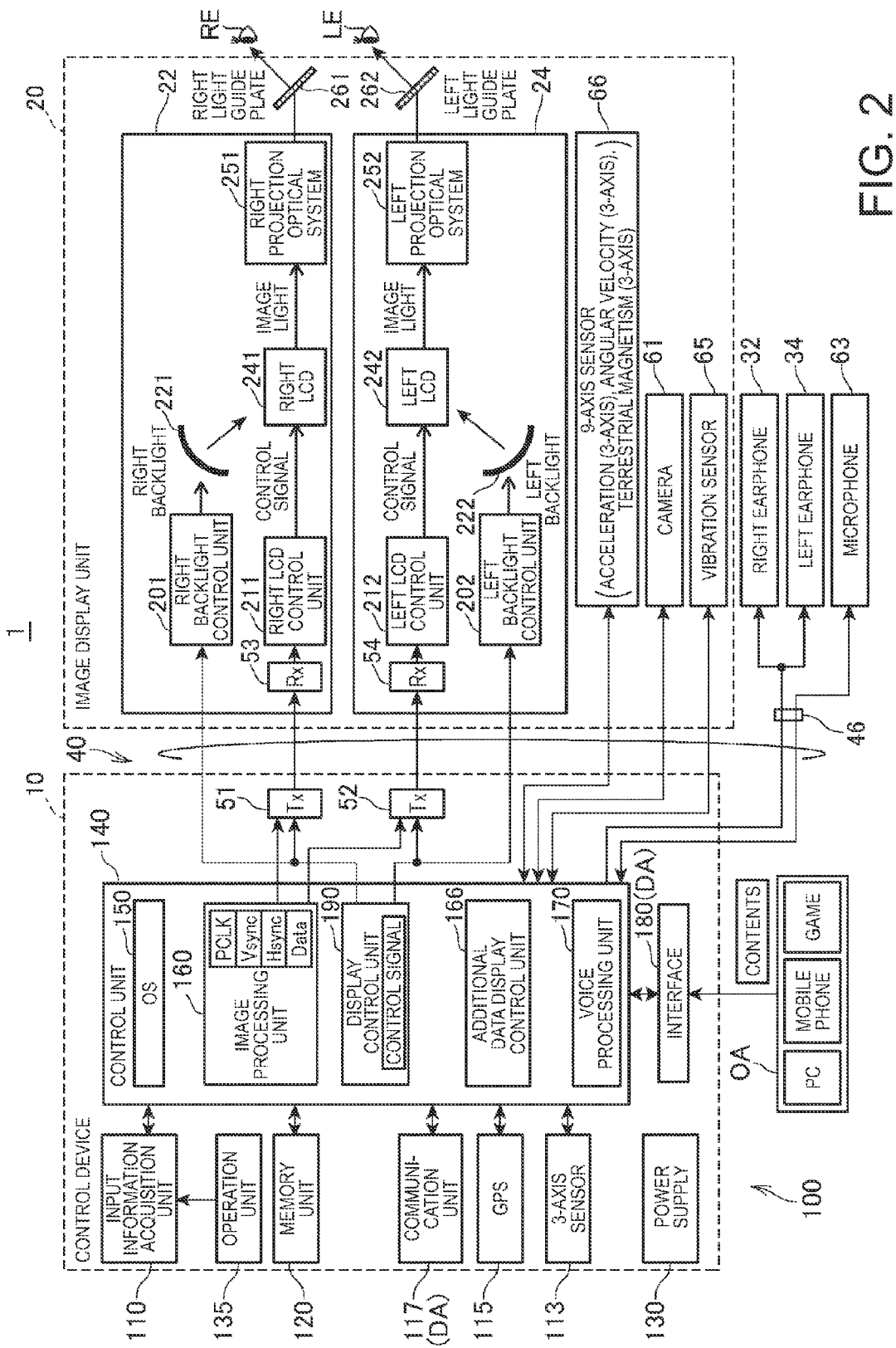
FIG. 2 is a block diagram illustrating a functional configuration of the head mounted display device.

FIG. 2 is a functional block diagram of respective units constituting a display system 1 according to the present embodiment.

As illustrated in FIG. 2, the display system 1 includes an external device OA and the head mounted display device 100. Examples of the external device OA include a personal computer (PC), a mobile phone terminal, and a game terminal. The external device OA is used as an image supply device that supplies an image to the head mounted display device 100.

The control device 10 of the head mounted display device 100 includes a control unit 140, an operation unit 135, an input information acquisition unit 110, a memory unit 120, a power supply 130, an interface 180, a transmission unit (Tx) 51, and a transmission unit (Tx) 52.

The operation unit 135 detects the operation of the user. The operation unit 135 includes respective units such as the determination key 11, the display switching key 13, the trackpad 14, the brightness switching key 15, the direction key 16, the menu key 17, and the power supply switch 18 illustrated in FIG. 1.

The input information acquisition unit 110 acquires a signal according to an operation input performed by the user. As the signal according to the operation input, an operation input with respect to the trackpad 14, the direction key 16, or the power supply switch 18 can be exemplified.

The power supply 130 supplies power to respective units of the head mounted display device 100. As the power supply 130, for example, a secondary battery can be used.

The memory unit 120 stores various computer programs. The memory unit 120 is configured of a ROM or a RAM. The memory unit 120 may store image data displayed on the image display unit 20 of the head mounted display device 100.

The interface 180 is an interface for connecting various external devices OA serving as sources of supplying contents to the control device 10. As the interface 180, for example, an interface corresponding to the wired connection such as a USB interface, a micro USB interface, and an interface for a memory card can be used.

The control unit 140 functions as an operating system (OS) 150, an image processing unit 160, a display control unit 190, and an additional data display control unit 166 by reading and executing the computer programs stored in the memory unit 120.

A 3-axis sensor 113, a GPS 115, and a communication unit 117 are connected to the control unit 140. The 3-axis sensor 113 is a 3-axis acceleration sensor and a detection value of the 3-axis sensor 113 can be acquired by the control unit 140. The GPS 115 includes an antenna (not illustrated), receives a global positioning system (GPS) signal, and acquires the current position of the control device 10. The GPS 115 outputs the current position or the current time acquired based on the GPS signal to the control unit 140. Further, the GPS 115 acquires the current time based on information included in the GPS signal and may have a function of correcting the time clocked by the control unit 140 of the control device 10.

The communication unit 117 performs wireless data communication in conformity with standards such as a wireless LAN (WiFi®), Miracast®, and Bluetooth®.

In a case where the external device OA is connected to the communication unit 117 in a wireless manner, the control unit 140 acquires content data from the communication unit 117 and performs control for displaying an image on the image display unit 20. Meanwhile, in a case where the external device OA is connected to the interface 180 in a wired manner, the control unit 140 acquires content data from the interface 180 and performs control for displaying an image on the image display unit 20. Accordingly, hereinafter, the communication unit 117 and the interface 180 are collectively referred to as data acquisition units DA.

The data acquisition units DA acquire the content data from the external device OA. The data acquisition unit DA acquires data of an image displayed by the head mounted display device 100 (hereinafter, referred to as "display image data") from the external device OA.

The image processing unit 160 acquires an image signal included in the contents. The image processing unit 160 separates a synchronization signal such as a vertical synchronization signal VSync or a horizontal synchronization signal HSync from the acquired image signal. Further, the image processing unit 160 generates a clock signal PCLK using a phase locked loop (PLL) circuit (not illustrated) or the like according to the frequency of the separated vertical synchronization signal VSync or horizontal synchronization signal HSync. The image processing unit 160 converts an analog image signal from which a synchronization signal is separated to a digital image signal using an A/D conversion circuit (not illustrated) or the like. Next, the image processing unit 160 stores the converted digital image signal in a DRAM of the memory unit 120 for each frame as image data (in the figure, Data) of the target image. The image data is, for example, RGB data.

In addition, the image processing unit 160 may perform image processing, for example, various color tone correction processing such as resolution conversion processing and adjusting the brightness or saturation, and keystone correction processing with respect to the image data as needed.

The image processing unit 160 transmits each of the generated clock signal PCLK, the vertical synchronization signal VSync, the horizontal synchronization signal HSync, and image data Data stored in the DRAM of the memory unit 120 through the transmission units 51 and 52. The image data Data transmitted through the transmission unit 51 is referred to as "image data for the right eye" and the image data Data transmitted through the transmission unit 52 is referred to as "image data for the left eye." The transmission units 51 and 52 function as a transceiver for serial transmission between the control device 10 and the image display unit 20.

The display control unit 190 generates a control signal that controls the right display driving unit 22 and the left display driving unit 24. Specifically, the display control unit 190 individually controls, with the control signal, ON/OFF driving of a right LCD 241 using a right LCD control unit 211; ON/OFF driving of a right backlight 221 using a right backlight control unit 201; ON/OFF driving of a left LCD 242 using a left LCD control unit 212; and ON/OFF driving of a left backlight 222 using a left backlight control unit 202. In this manner, the display control unit 190 controls generation and emission of image light using each of the right display driving unit 22 and the left display driving unit 24. For example, the display control unit 190 allows both of the right display driving unit 22 and the left display driving unit 24 to generate image light, allows only one of the right display driving unit 22 and the left display driving unit 24 to generate image light, or allows both not to generate image light.

The display control unit 190 respectively transmits the control signals to the right LCD control unit 211 and the left LCD control unit 212 through the transmission units 51 and 52. In addition, the display control unit 190 respectively transmits the control signals to the right backlight control unit 201 and the left backlight control unit 202.

The image display unit 20 includes the right display driving unit 22, the left display driving unit 24, the right light guide plate 261 serving as the light optical image display unit 26, the left light guide plate 262 serving as the left optical image display unit 28, the camera 61, a vibration sensor 65, and a 9-axis sensor 66.

The vibration sensor 65 is configured using an acceleration sensor and is arranged in the inside of the image display unit 20 as illustrated in FIG. 1. In the right holding unit 21 of the example of FIG. 1, the vibration sensor 65 is incorporated in the vicinity of the end portion ER of the right optical image display unit 26. In a case where the user performs an operation of knocking the end portion ER, the vibration sensor 65 detects the vibration caused by the operation and outputs the detected results to the control unit 140. The control unit 140 detects the knocking operation of the user using the detected results of the vibration sensor 65.

The 9-axis sensor 66 is a motion sensor that detects the acceleration (3-axis), the angular velocity (3-axis), and the terrestrial magnetism (3-axis). Since the 9-axis sensor 66 is provided in the image display unit 20, the control unit 140 detects the motion of the head of the user based on the detection value of the 9-axis sensor 66 when the image display unit 20 is mounted on the head of the user. Since the orientation of the image display unit 20 can be seen from the detected motion of the head of the user, the control unit 140 can assume the visual line direction of the user.

The right display driving unit 22 includes a receiving unit (Rx) 53; a right backlight (BL) control unit 201 and a right backlight (BL) 221 functioning as light sources; a right LCD control unit 211 and a right LCD 241 functioning as display elements; and a right projection optical system 251. The right backlight control unit 201 and the right backlight 221 function as light sources. The right LCD control unit 211 and the right LCD 241 function as display elements. In addition, the right backlight control unit 201, the right LCD control unit 211, the right backlight 221, and the right LCD 241 are also collectively referred to as "image light generation units."

The receiving unit 53 functions as a receiver for serial transmission between the control device 10 and the image display unit 20. The right backlight control unit 201 drives the right backlight 221 based on the input control signal. The right backlight 221 is a light emitting body such as an LED or electroluminescence (EL). The right LCD control unit 211 drives the right LCD 241 based on the clock signal PCLK input through the receiving unit 53, the vertical synchronization signal VSync, the horizontal synchronization signal HSync, and image data Data 1 for a right eye. The right LCD 241 is a transmissive liquid crystal panel in which a plurality of pixels are arranged in a matrix.

The right projection optical system 251 is configured of a collimating lens that makes image light emitted from the right LCD 241 into a parallel light flux. The right light guide plate 261 serving as the right optical image display unit 26 guides the image light output from the right projection optical system 251 to a right eye RE of the user while reflecting the image light along a predetermined optical path. Further, the right projection optical system 251 and the right light guide plate 261 are also collectively referred to as "light guide units."

The left display driving unit 24 has a configuration which is the same as that of the right display driving unit 22. The left display driving unit 24 includes a receiving unit (Rx) 54; a left backlight (BL) control unit 202 and a left backlight (BL) 222 functioning as light sources; a left LCD control unit 212 and a left LCD 242 functioning as display elements; and a left projection optical system 252. The left backlight control unit 202 and the left backlight 222 function as light sources. The left LCD control unit 212 and the left LCD 242 function as display elements. In addition, the left backlight control unit 202, the left LCD control unit 212, the left backlight 222, and the left LCD 242 are also collectively referred to as "image light generation units." The left projection optical system 252 is configured of a collimating lens that makes image light emitted from the left LCD 242 into a parallel light flux. The left light guide plate 262 serving as the left optical image display unit 28 guides the image light output from the left projection optical system 252 to a left eye LE of the user while reflecting the image light along a predetermined optical path. Further, the left projection optical system 252 and the left light guide plate 262 are also collectively referred to as "light guide units."

The head mounted display device 100 of the present embodiment includes the additional data display control unit 166 as a control unit that allows the image display unit 20 to display the data acquired by the data acquisition unit DA. The head mounted display device 100 may acquire various kinds of data such as moving images, still images, characters, and symbols using the data acquisition unit DA. In this case, the additional data display control unit 166 may allow various contents such as images or characters to be displayed based on various kinds of data acquired by the data acquisition unit DA.

In the present embodiment, an example in which the additional data display control unit 166 allows the image display unit 20 to display characters based on the data acquired by the data acquisition unit DA will be described.

The voice processing unit 170 acquires a voice signal included in the contents, amplifies the acquired voice signal, and supplies the voice signal to a speaker (not illustrated) in the right earphone 32 and a speaker (not illustrated) in the left earphone 34 connected to the coupling member 46. Further, in a case where a Dolby® system is employed, processing with respect to the voice signal is performed and different sounds whose frequencies or the like are changed are output from each of the right earphone 32 and the left earphone 34.

Further, the voice processing unit 170 performs processing related to a voice by acquiring the voice collected by the microphone 63 and converting the voice to digital voice data. For example, the voice processing unit 170 recognizes individual voices of a plurality of people and may perform speaker recognition that identifies a person who is speaking for each voice by extracting characteristics from the acquired voices and modeling the voices.

In the present embodiment, the voice processing unit 170 outputs the voice collected by the microphone 63 to the additional data display control unit 166 as digital voice data. The additional data display control unit 166 performs a displaying process described below based on the voice data input from the voice processing unit 170. The additional data display control unit 166 has a function of converting the voice to text by performing a voice recognition process based on the voice data. In this voice recognition process, the additional data display control unit 166 can identify the kind of the language of the voice data.

As described above, since the microphone 63 has directivity, the additional data display control unit 166 recognizes the voice of the user on which the head mounted display device 100 is mounted in the visual line direction and performs a process based on the voice. For example, the additional data display control unit 166 performs a displaying process and allows the image display unit 20 to display characters constituting the text (character string) generated from the voice data or the data related to the text.

The 3-axis sensor 113, the GPS 115, and the communication unit 117 are connected to the control unit 140. The 3-axis sensor 113 is the 3-axis acceleration sensor and the control unit 140 can detect the motion of the control device 10 and the direction of the motion by acquiring the detection value of the 3-axis sensor 113.

The GPS 115 includes an antenna (not illustrated), receives a global positioning system (GPS) signal, and acquires the current position of the control device 10. The GPS 115 outputs the current position or the current time acquired based on the GPS signal to the control unit 140. Further, the GPS 115 acquires the current time based on information included in the GPS signal and may have a function of correcting the time clocked by the control unit 140 of the control device 10.

The communication unit 117 performs wireless data communication in conformity with standards such as a wireless LAN (WiFi®) and Bluetooth®.

The interface 180 is an interface for connecting various image supply devices OA serving as sources of supplying contents to the control device 10. The contents supplied by the image supply device OA includes moving images or still images and may include voices. As the image supply device OA, a personal computer (PC), a mobile phone terminal, or a game terminal can be exemplified. As the interface 180, for example, a USB interface, a micro USB interface, an interface for a memory card or the like can be used.

Here, the image supply device OA can be connected to the control device 10 using a wireless communication line. In this case, the image supply device OA performs wireless communication with the communication unit 117 and transmits content data using a wireless communication technique such as Miracast®.

Figure 3:
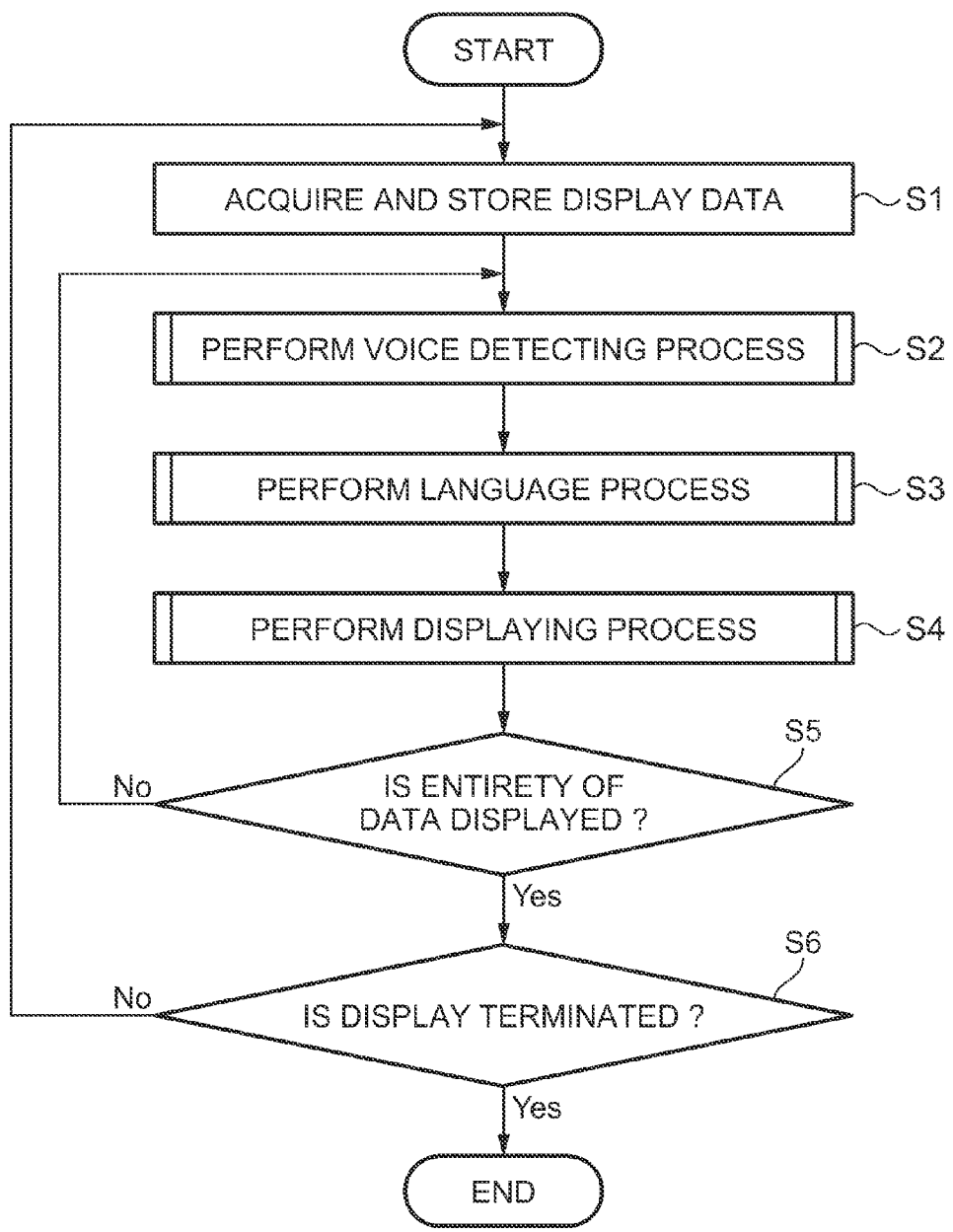
FIG. 3 is a flowchart illustrating an operation of the head mounted display device.

FIG. 3 is a flowchart illustrating the operation of the head mounted display device 100 and particularly illustrating a data displaying process using a function of the additional data display control unit 166. The data displaying process is a process in which data such as characters related to the outside scenery is displayed by the image display unit 20 when the user sees the outside scenery through the right optical image display unit 26 and the left optical image display unit 28. The character information related to the outside scenery can be seen by the user together with the outside scenery by the data displaying process.

First, the control unit 140 of the head mounted display device 100 acquires the display data using the data acquisition unit DA (Step S1). The data acquired by the data acquisition unit DA is stored in the memory unit 120. The data received in Step S1 can be used as various kinds of data such as moving image data, still image data, and text data and an example in which text data formed of a character string is acquired or displayed will be described in the present embodiment.

Next, the control unit 140 performs a voice detecting process (Step S2). In the voice detecting process, the additional data display control unit 166 allows the voice processing unit 170 to convert the voice collected by the microphone 63 to digital voice data, output the data to the additional data display control unit. 166, and detect the contents of the voice from the voice data. In the voice detecting process in Step S2, the additional data display control unit 166 acquires information related to the voice heard from the outside scenery as information related to the outside scenery visually recognized through image display unit 20. The outside scenery visually recognized through the image display unit 20 is outside scenery seen by the eyes of the user through the image display unit 20.

The head mounted display device 100 may have a mechanism of detecting the direction of the eyes of the user and specifying the visual line direction, but may assume the visual line direction of the user. The head mounted display device 100 is mounted on the head of the user and fixed thereto such that the image display unit 20 is arranged in front of the eyes of the user. Accordingly, it can be assumed that the visual line direction of the user is directed to a direction opposite to the head of the user using the image display unit 20 as a reference. For example, the imaging direction of the camera 61 illustrated in FIG. 1 is directed toward the visual line direction. Further, the directivity of the microphone 63 can be set as the visual line direction of the user.

The additional data display control unit 166 sets information obtained related to the light or the voice coming to the head mounted display device 100 from the visual line direction of the user as information related to the outside scenery visually recognized by the user.

The control unit 140 performs a language process (Step S3). In the language process, the additional data display control unit 166 performs a process related to the kind of the language on the voice data processed in the voice detecting process in Step S2.

Further, the control unit 140 performs a displaying process (Step S4). In the displaying process, the additional data display control unit 166 determines the display attributes of the characters based on the results of the voice detecting process in Step S2 and the language process in Step S3, and the display control unit 190 performs the display.

Respective processes in Steps S2 to S4 will be described below.

Next, the control unit 140 determines whether the entirety of data acquired in Step S1 is processed in Steps S2 to S4 (Step S5). In a case where unprocessed data is present (Step S5: NO), the process returns to Step S2 and the control unit 140 performs a process on the unprocessed data. Further, in a case where the process on the entirety of data is terminated (Step S5: YES), the control unit 140 determines whether to finish displaying the data (Step S6). In the case where displaying of the data is continued (Step S6: NO), the process of the control unit 140 returns to Step S1. Further, in a case where displaying of the data is finished according to the operation or the like detected by the operation unit 135 (Step S6: YES), the control unit 140 stops displaying and finishes the main process using the display control unit 190.

Figure 4:
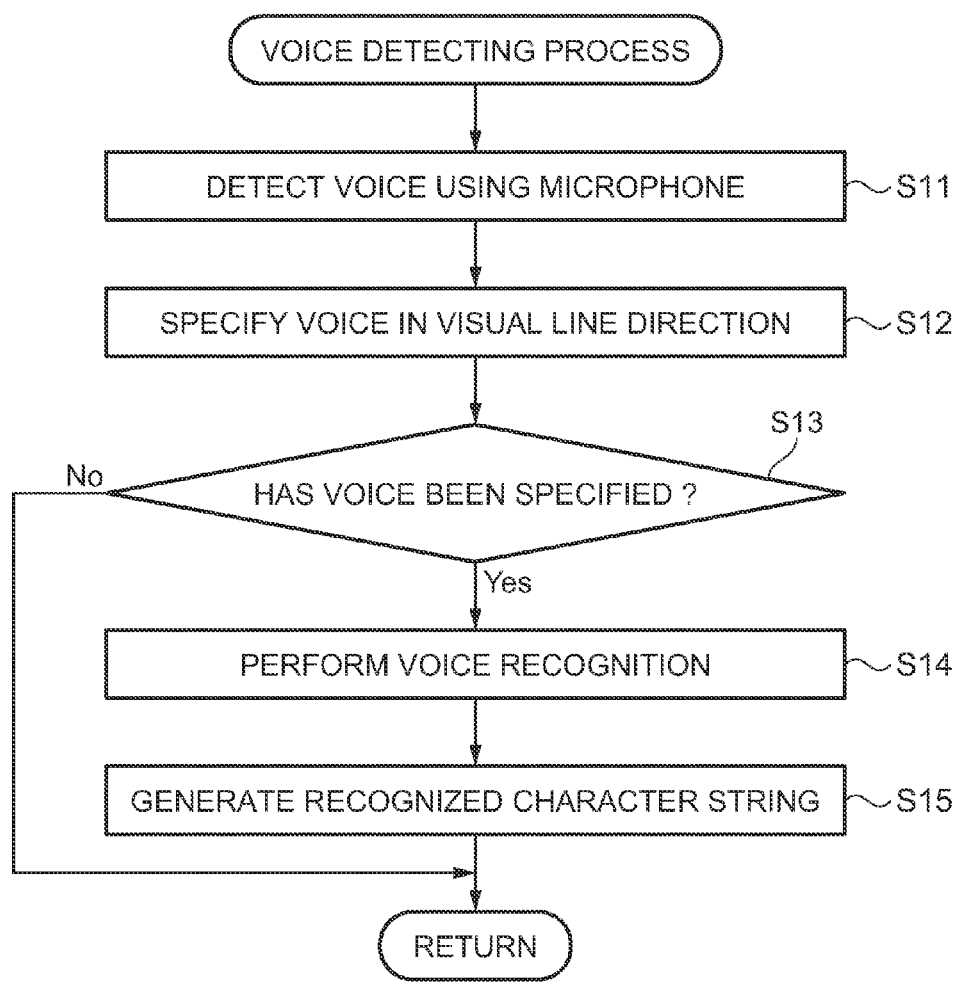
FIG. 4 is a flowchart specifically illustrating a voice detecting process.

FIG. 4 is a flowchart specifically illustrating the voice detecting process in Step S2 of FIG. 3.

In the voice detecting process, the voice is detected by the microphone 63 (Step S11). That is, the microphone 63 collects the voice and outputs the voice signal to the control unit 140, and the voice processing unit 170 generates the digital voice data based on the voice signal.

Next, the additional data display control unit 166 specifies the voice received from the visual line direction of the user based on the voice data generated by the voice processing unit 170 (Step S12). In Step S12, the additional data display control unit 166 identifies the sound source of the voice collected by the microphone 63. Examples of the sound source include a voice of a person, a sound emitted by a particular object such as a musical instrument, and an environmental sound. For example, the additional data display control unit 166 selects a sound with the highest volume or a sound with the highest clarity from among the sound sources included in the voice data. In this manner, a voice from the sound sources closest to the visual line direction of the user is specified.

Further, in a case where the kinds of sound sources in the visual line direction are known in advance, the additional data display control unit 166 acquires the frequency distribution of the voice collected by the microphone 63 based on the voice data generated by the voice processing unit 170 and extracts a sound of a specific frequency component largely containing sounds from the corresponding sound sources, and the sound of the frequency component may be used as the voice in the visual line direction. Alternatively, the additional data display control unit 166 may extract the voice in the frequency bandwidth with a large volume in the frequency distribution of the voice collected by the microphone 63. In this manner, the additional data display control unit 166 specifies the voice from the visual line direction by performing a process using the volume as a reference or a process specifying the sound source.

The voice in the visual line direction which is specified by the additional data display control unit 166 in Step S12 or the information related to the specified voice corresponds to an example of information related to the outside scenery visually recognized through the image display unit 20.

Figure 8A:
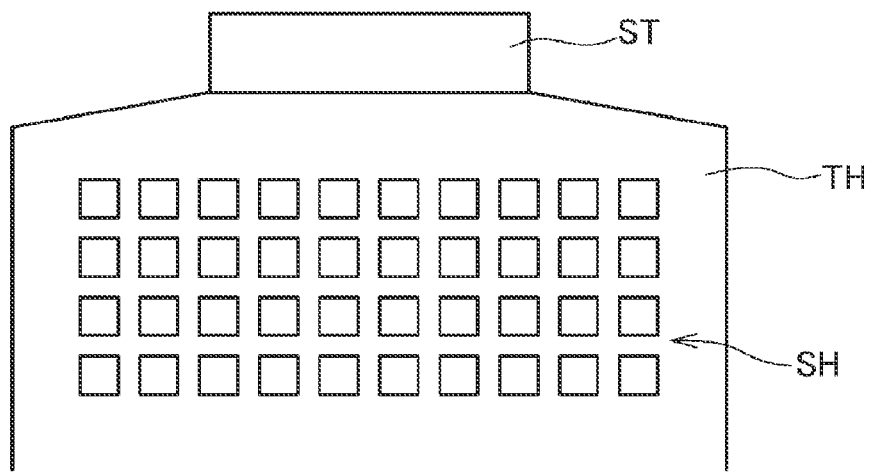
FIGS. 8A and 8B are views illustrating typical application examples of the head mounted display device.
Figure 8B:
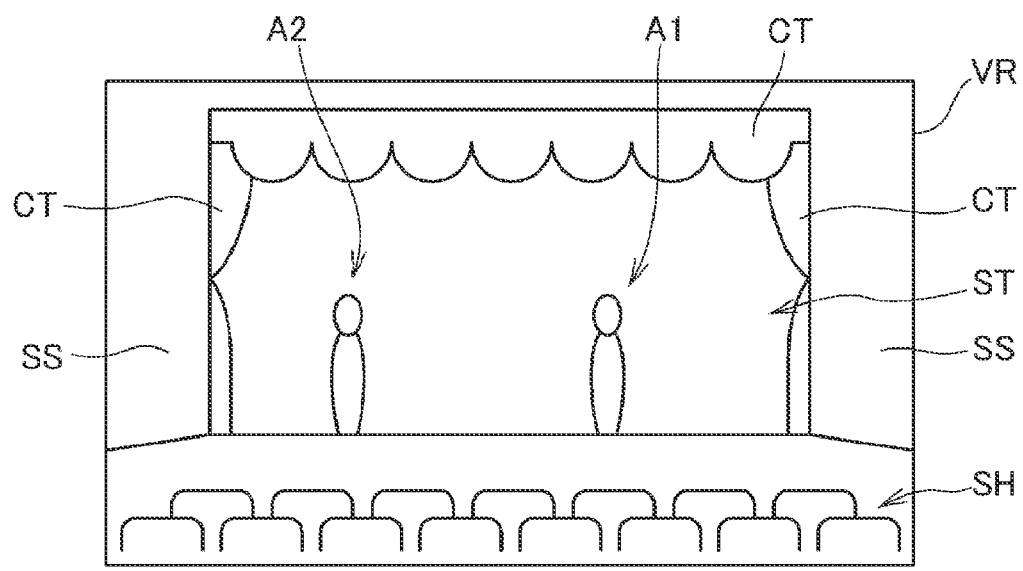
Figure 9A:
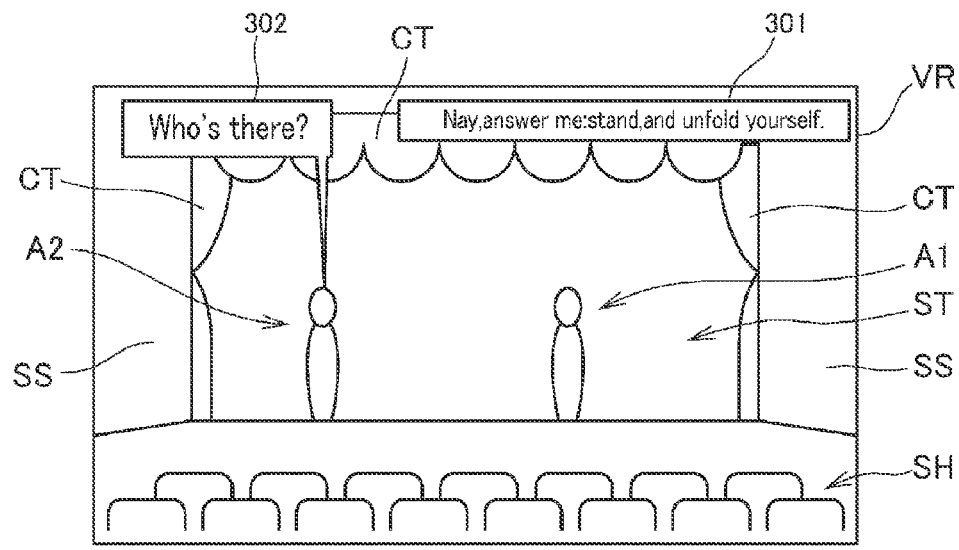
FIGS. 9A and 9B are views illustrating typical application examples of the head mounted display device.
Figure 9B:
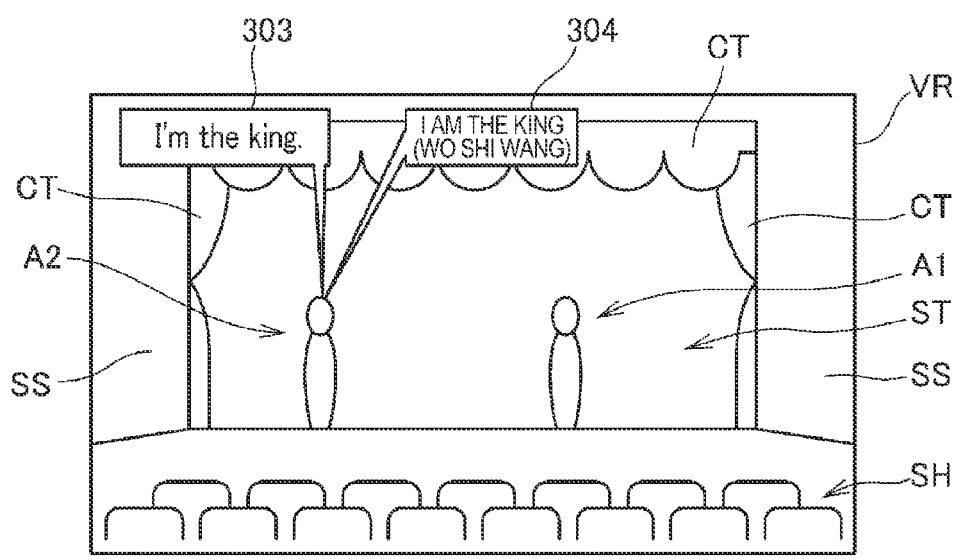

FIGS. 8A to 9B are explanatory views illustrating typical application examples of the invention. FIG. 8A is a view schematically illustrating a configuration of a theater TH in which the head mounted display device 100 is used and FIG. 8B illustrates an example of the field of vision VR of the user that uses the head mounted display device 100 in the theater TH. FIG. 9A illustrates a display example in which text is displayed by the image display unit 20 and FIG. 9B illustrates another display example of the image display unit 20.

The theater TH illustrated in FIG. 8A has a configuration in which plural seats SH for the audience including the user of the head mounted display device 100 are arranged such that the seats SH are directed to a stage ST. the user of the head mounted display device 100 uses the head mounted display device 100 at the time of seeing the stage ST while being seated on the seat SH.

The field of vision VR in FIG. 8B indicates the field of vision which is seen by the user through the right optical image display unit 26 and the left optical image display unit 28 of the image display unit 20. Since the image display unit 20 has a characteristic in which the image display unit 20 can be visually recognized through the outside scenery, the stage ST can be seen from the field of vision VR. The field of vision VR includes a curtain CT arranged above the stage ST and the left and right ends thereof and stage wings SS arranged on the left and right sides of the stage ST. An actor A is seen from the stage ST. In the example, two actors A1 and A2 are on the stage ST and the actors A1 and A2 are seen by the user. Further, the audience in the seats SH hears the voice including the voices of the actors A1 and A2 or stage music.

In the voice detecting process of FIG. 4, since the additional data display control unit 166 specifies the voice in the visual line direction of the user, the additional data display control unit 166 detects the voice emitted from the actor in the visual line direction of the user between the actors A1 and A2 in the example of FIG. 8B.

Returning to FIG. 4, the additional data display control unit 166 determines whether the voice in the visual line direction can be specified (Step S13). In a case where the voice is successfully specified (Step S13: YES), the additional data display control unit 166 performs a voice recognition process on the specified voice (Step S14) and generates data including a character string (Step S15).

The voice recognition process is a process that converts voice data to text (characters) data. In the example of FIG. 8B, the additional data display control unit 166 generates text data from the voice uttered by the actor A1 or A2.

In addition, in a case where the voice in the visual line direction is not specified (Step S13: NO), the additional data display control unit 166 omits processes of Step S14 and Step S15.

Figure 5:
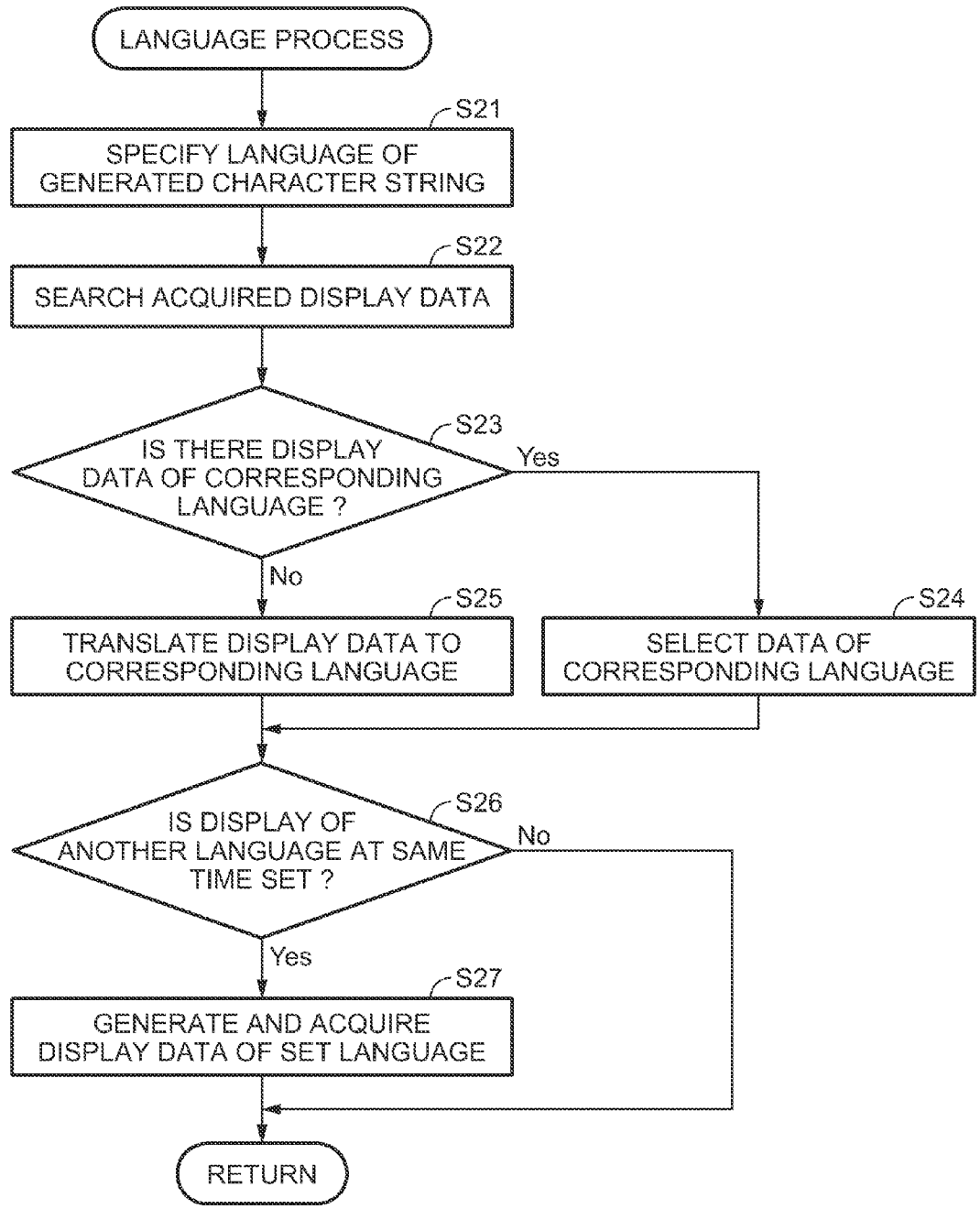
FIG. 5 is a flowchart specifically illustrating a language process.

FIG. 5 is a flowchart specifically illustrating the language process in Step S3 of FIG. 3.

In the language process, the language of the character string generated in the voice detecting process (FIG. 4) is specified (Step S21). For example, the additional data display control unit 166 specifies the language to which the character string generated in the voice detecting process belongs from among languages of English, Japanese, Chinese (simplified), Chinese (traditional), Spanish, Portuguese, French, German, and Italian. The additional data display control unit 166 may specify the language in a case where the voice recognition is performed in the voice detecting process (Step S14 of FIG. 4). In this case, the data showing the language specified in the voice recognition process may be acquired in Step S21.

The additional data display control unit 166 searches (Step S22) the data of the language specified in Step S21 from the data acquired in Step S1 (FIG. 3). The additional data display control unit 166 determines whether the display data of the language specified in Step S21 is present (Step S23) and the display data is selected (Step S24) in a case where the corresponding display data is present (Step S23: YES). Further, in a case where the display data of the language specified in Step S21 is not present (Step S23: NO), the additional data display control unit 166 selects any display data and translates the data into the language specified in Step S21 (Step S25).

Next, the additional data display control unit 166 determines whether to perform display of another language at the same time (Step S26). The display of another language at the same time is an operation of displaying the character string of the detected language and a character string of a language different from the detected language. In the head mounted display device 100, when the operation of displaying the detected language and another language at the same time is set to be performed (Step S26: YES), the additional data display control unit 166 generates or acquires the display data of the set language (Step S27). The character strings displayed by the function of displaying the languages at the same time are a character string selected or translated in Steps S24 and S25 and a character string corresponding to the character string. For example, the character string may be a character string of a different language having the same meaning or a character string which is set in advance. That is, the additional data display control unit 166 acquires a character string for displaying languages at the same time by translating the character string selected or translated in Steps S24 and S25 to another language and selecting the corresponding language from the display data acquired in Step S1. In Step S27, character strings of plural languages are acquired as character strings for display. After the process of Step S27, the additional data display control unit 166 proceeds to the displaying process (Step S4).

Moreover, in a case where the operation of displaying different languages at the same time is not set to be performed (Step S26: NO), the additional data display control unit 166 does not perform the process of Step S27 and proceeds to the displaying process of Step S4.

The "set language" processed by the additional data display control unit 166 in Step S27 maybe set in advance and stored in the memory unit 120 as set data or may be designated by the user operating the control device 10. In addition, in a case where the voice of the user is detected from among voices collected by the microphone 63, the additional data display control unit 166 determines the language of the voice of the user and may set the language as the above-described "set language." The additional data display control unit 166 can detect the voice of the user by extracting voices with high (strong) signal levels from among voice signals collected by the microphone 63. Further, the setting of the language based on the voice of the user may be performed after the additional data display control unit 166 starts the operation of FIG. 3. In this case, when the user utters the voice, the additional data display control unit 166 determines the language. In addition, the display data of the determined language is displayed by the displaying process. In this case, the user can see the display data of the language uttered by the user without performing a special setting operation. Moreover, a language may be set whenever the user utters the voice in the middle of the operation of FIG. 3 and the temporarily set language may be changed.

Figure 6:
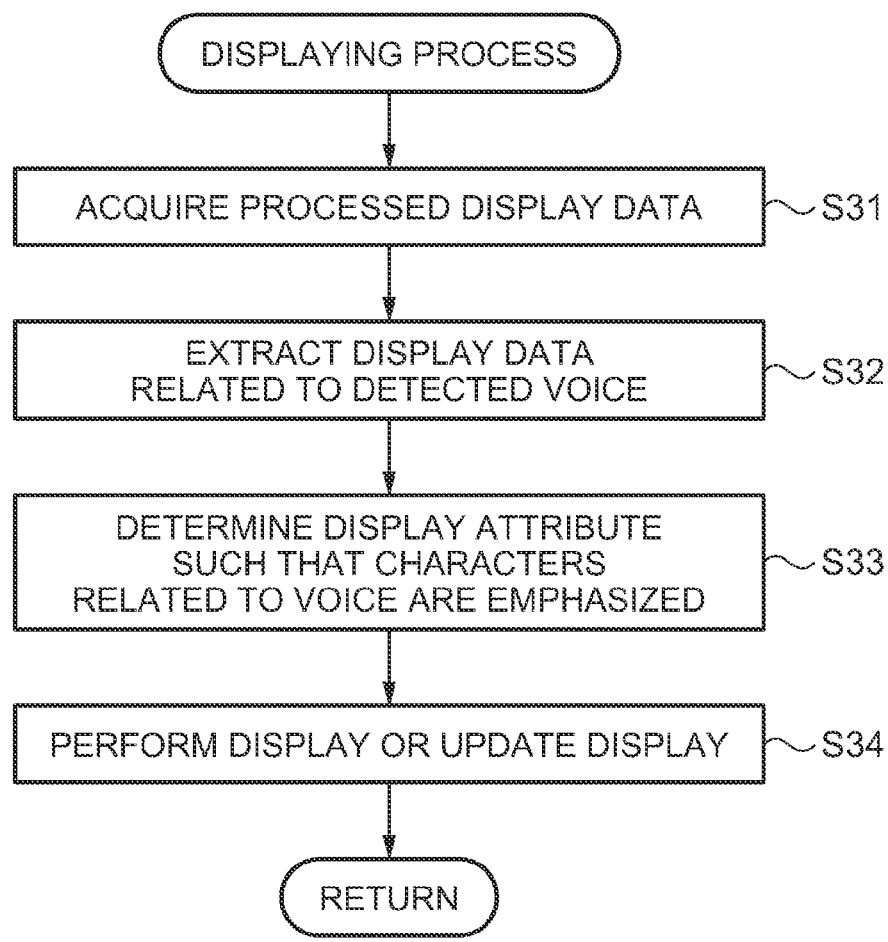
FIG. 6 is a flowchart specifically illustrating a displaying process.

FIG. 6 is a flowchart specifically illustrating the displaying process in Step S4 of FIG. 3.

In the displaying process, the additional data display control unit 166 acquires (Step S31) data (for example, a character string) for display generated or selected in the voice detecting process (Step S2) or the language process (Step S3).

The additional data display control unit 166 extracts (Step S32) display data related to the voice detected in the voice detecting process (Step S2) from display data acquired in Step S31 and determines the display attributes of the extracted display data (Step S33).

In Step S32, the additional data display control unit 166 extracts a character string in which the voice detected in Step S11 (FIG. 4) is converted or a character string corresponding to the detected voice. Here, the additional data display control unit 166 performs voice recognition with respect to the detected voice and may extract the display data based on the recognized character string.

Further, the additional data display control unit 166 determines the display attributes such that the display data (characters or character strings) related to the voice detected in Step S33 is emphasized more than other display data. For example, the additional data display control unit 166 sets the display size of the display data extracted in Step S32 to be larger than that of other display data or sets the display data thereof to have a color to stand out more than the display color of other display data. In this mariner, the additional data display control unit 166 determines the display mode of the entirety of display data.

Subsequently, the additional data display control unit 166 outputs the determined display attributes and the display data to the display control unit 190, allows the image display unit 20 to display an image, or updates the display when the image display unit displays an image (Step S34), and the process proceeds to Step S5.

FIGS. 9A and 9B illustrate examples in which the head mounted display device 100 displays a character string as an example of the display data. FIG. 9A illustrates an example which is displayed in the displaying process.

As illustrated in FIG. 9A, voice corresponding character strings 301 and 302 are displayed in the field of vision VR seen by the user. FIG. 9A illustrates an example in which the visual line direction of the user is directed to the actor A2. The voice corresponding character string 302 is a character string related to the voice detected from the visual line direction of the user and a character string related to the voice uttered by the actor A2 in this example. Meanwhile, the voice corresponding character string 301 is a character string which is not included in the display data related to the voice detected from the visual line direction of the user from among the display data acquired by the head mounted display device 100. Such display data includes display data not related to the voice or display data related to the voice detected before the display timing of the voice corresponding character string 302.

The display attributes of the voice corresponding character strings 301 and 302 are determined in Step S33 of the displaying process (FIG. 6). The display attributes are adjusted such that the voice corresponding character string 302 is displayed in bold characters, the character size of the voice corresponding character string 302 is larger than that of the voice corresponding character string 301, and the voice corresponding character string 302 is emphasized over the voice corresponding character string 301.

In addition, the voice corresponding character string 302 is displayed in a frame having a balloon shape indicating that the voice corresponding character string 302 is a character string related to the voice currently uttered by the actor A2 and the voice corresponding character string 301 is displayed in a frame having a square shape. A display frame of a character string is included in display attributes.

FIG. 9B illustrates an example of displaying languages different from each other at the same time.

In FIG. 9B, voice corresponding character strings 303 and 304 are displayed in the field of vision VR. The voice corresponding character string 303 is a character string related to the voice detected from the visual line direction of the user and an English character string related to the voice uttered by the actor A2 in this example. Meanwhile, the voice corresponding character string 304 is a character string of another language (Chinese (simplified)) corresponding to the voice corresponding to the voice corresponding character string 303. Since the voice corresponding character strings 303 and 304 are both included in display data related to the voice uttered by the actor A2, the same display attribute is set.

In addition, in a theater in which an actor appears in a performance as the example illustrated in FIGS. 8A to 9B, a display is disposed in the stage wings SS in some cases. In this kind of display, the voice (the lines or the like) uttered by an actor or the character string related to the description of a play is displayed. In the related art, the character string displayed in the above-described display can be displayed as the voice corresponding character strings 301, 302, 303, and 304 by the head mounted display device 100. Further, in a case where the display is disposed, the display is seen in the field of vision VR. In this case, the head mounted display device 100 may display the voice corresponding character strings in a position that does not overlap the display.

Further, in the examples of FIGS. 9A and 9B, the voice corresponding character strings 301, 302, 303, and 304 are arranged so as not to disturb the user while seeing the stage ST. For example, as illustrated in FIGS. 9A and 9B, the voice corresponding character strings 301, 302, 303, and 304 are arranged in a position that overlaps the curtain CT over the stage ST, the stage wings SS, or a position below the stage ST.

In addition, the display modes (for example, a display position or a display method) in a case where the head mounted display device 100 displays information may not be constant. For example, the voice corresponding character strings 301, 302, 303, and 304 of FIGS. 9A and 9B are displayed in a position over the field of vision VR, specifically, a position that overlaps the curtain CT such that the voice corresponding character strings 301, 302, 303, and 304 do not overlap the stage ST, but the display position may be moved. For example, in a case where the head mounted display device 100 can detect the distance between the stage ST or the actors A1 and A2 and the head mounted display device 100, the display mode (including the display position) may be changed according to the distance. Here, the head mounted display device 100 detects the distance by detecting an image of the actors A1 and A2 or the curtain CT from the captured image of the camera 61 and analyzing the captured image. Alternatively, the head mounted display device 100 may detect the distance from a speaker (utterer) based on the voice collected by the microphone 63. The head mounted display device 100 may measure the distance using lasers, ultrasonic waves, sound waves, or other electromagnetic methods. In addition, the head mounted display device 100 can employ a known method of measuring or detecting the distance. Particularly, it is preferable that the head mounted display device 100 detect the distance to a subject (a part of the stage ST or the actors A1 and A2) in a direction corresponding to the voice in the visual line direction specified in the voice detecting process in Step S12.

The additional data display control unit 166 changes the display mode of information (for example, the voice corresponding character strings 301, 302, 303, and 304) corresponding to the detected distance. The display mode includes the display position, the display size, and the display method. Specifically, in a case where the detected distance is shorter (closer) than a reference value set in advance, the additional data display control unit 166 sets the display position of information in a position that does not disturb the user while seeing the stage ST, for example, a position that overlaps the curtain CT or a position that overlaps the stage wing SS. In this case, the display size of the information may be reduced. Further, in order not to disturb the user while seeing the stage ST, the vertical display and the horizontal display of the text may be switched. In addition, when the microphone 63 detects the voice, the information related to the voice may be pop-up displayed and the display may be eliminated after a predetermined amount of time is passed. Further, for example, in a case where the detected distance is longer (farther) than a predetermined reference value or a reference value, the additional data display control unit 166 sets the display position of the information to a position at the center of the field of vision VR or a position close to the center thereof. In this case, the display size of the information may be increased. That is, the additional data display control unit 166 reduces the display size or sets the display position to an end portion of the field of vision VR such that the information is not extremely noticeable in a case where the head mounted display device 100 is close to the target (the stage ST or the actors A1 and A2) in the visual line direction. Further, in a case where the head mounted display device 100 is far from the target in the visual line direction, the additional data display control unit 166 increases the display size or sets the display position to the center portion of the field of vision VR such that the visibility of the information is improved. In this manner, display in correspondence with the positional relationship between the target and the user becomes possible.

Figure 7:
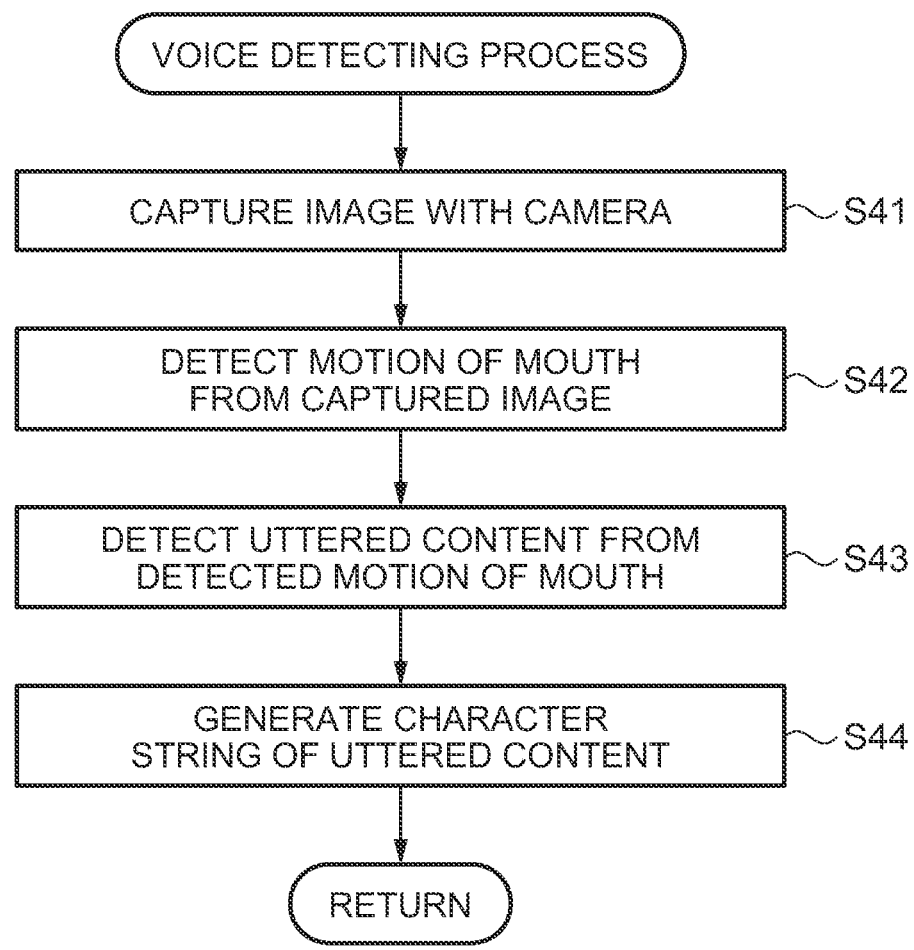
FIG. 7 is a flowchart illustrating a modification example of the voice detecting process.

Further, in the voice detecting process (Step S2), the example in which the microphone 63 is used has been described, but a configuration in which the voice in the visual line direction of the user is detected using the camera 61 may be employed. This modification example is illustrated in the flowchart of FIG. 7.

The additional data display control unit 166 controls the camera 61 to capture an image and acquires the captured image (Step S41). Next, the additional data display control unit 166 detects a motion of a mouth based on the captured image of the camera 61 (Step S42). For example, the additional data display control unit 166 acquires a plurality of images captured by the camera 61 in chronological order, extracts an image showing a mouth of a person from each image, and detects a change in shape of the extracted image. The additional data display control unit 166 detects (Step S43) the uttered content from the motion of the mouth detected in Step S42, generates (Step S44) a character string corresponding to the detected uttered content, and terminates the voice detecting process. The information related to the motion of the mouth detected in Step S42 and/or the uttered content specified by the additional data display control unit 166 in Step S43 corresponds to an example of information related to the outside scenery visually recognized through the image display unit 20.

As illustrated in FIG. 1, the camera 61 is arranged in the image display unit 20 and the imaging direction of the camera 61 coincides with or substantially coincides with the visual line direction of the user. Accordingly, the character string generated based on the captured image of the camera 61 is a character string related to the voice uttered by the actor A1 or the actor A2 (FIG. 8B) present in the visual line direction of the user. Therefore, the voice can be detected using the camera 61 as in the case of using the microphone 63 having directivity.

As described above, the head mounted display device 100 according to the embodiment to which the invention is applied includes the image display unit 20 that allows the user to visually recognize an image and through which the outside scenery is transmitted; and the microphone 63 that detects a voice. In addition, the head mounted display device 100 further includes the data acquisition unit DA that acquires data; and the additional data display control unit 166 that allows the image display unit 20 to display an image based on the voice detected by the microphone 63 and the data acquired by the data acquisition unit DA when the outside scenery can be visually recognized through the image display unit 20. With such a configuration, the head mounted display device 100 displays data in consideration of the state or the content of the voice and thus information corresponding to the external factors outside the head mounted display device 100 can be displayed. The voice detection unit can use the camera 61 as illustrated in FIG. 7 without limiting to the microphone 63.

Moreover, the additional data display control unit 166 acquires information related to the outside scenery visually recognized through the image display unit 20 and allows the image display unit 20 to display an image based on the acquired information. In this manner, it is possible to display an image corresponding to the outside scenery visually recognized by the user of the head mounted display device 100.

The additional data display control unit 166 acquires the uttered content or the like of a speaking person as the information related to the outside scenery based on the captured image of the camera 61 or the voice collected by the microphone 63. The additional data display control unit 166 displays the text related to the uttered content using the image display unit 20. The additional data display control unit 166 may detect a specific person or object from the outside scenery in the visual line direction by detecting an object (including a person) positioned at the center of the angle of view of the camera 61 in the captured image of the camera 61 and detecting an object in a position of the captured image which changes with time. For example, the motion of a mouth of a person may be detected by detecting an object whose shape changes with time from the shape of the captured image of the camera 61. The additional data display control unit 166 can detect a person in the visual line direction of the user using the above-described method. Further, any person may be selected in a case where a plurality of people are detected. Examples of the reference of the selection include the distance from the center in the angle of view of the camera 61, the color, the size, and the motion in the captured image of the camera 61, and these conditions may be stored in the memory unit 120 in advance. Further, ranking may be performed on the plurality of detected people. Further, the voice of a selected person or a highly ranked person is extracted from the voices collected by the microphone 63 and the voice can be used to display the display data. In addition, the additional data display control unit 166 detects a region that displays an image by the control of the display control unit 190 in the image display unit 20 through which the outside scenery is transmitted and a region that overlaps the target in the outside scenery and then may allow the image display unit 20 to display an image by avoiding these regions.

In addition, the additional data display control unit 166 allows the image display unit 20 to display data acquired by the data acquisition unit DA in a display mode corresponding to the voice detected by the microphone 63. Accordingly, the data is displayed in the display mode corresponding to the detected voice and can be seen by the user.

Moreover, the additional data display control unit 166 allows the image display unit 20 to display data corresponding to the voice detected by the microphone 63 from among the data acquired by the data acquisition unit DA. Accordingly, for example, the data related to the detected voice can be displayed. In a case where the voice detected by the microphone 63 is heard by the user, it is possible to perform display presentation corresponding to the voice by displaying the data corresponding to the voice and to provide the information related to the voice for the user.

In addition, since the additional data display control unit 166 allows the image display unit 20 to display characters based on the data acquired by the data acquisition unit DA, it is possible to provide information related to the voice using the characters. Further, the head mounted display device 100 allows the image display unit 20 to display the characters corresponding to the voice detected by the camera 61 and the microphone 63 in a mode different from other characters (display data) as illustrated in FIG. 9A. Specifically, for example, the display modes can be set by determining a display attribute different from other characters, setting the display size to be larger than those of other display data, setting the display color as a color standing out more than those of other display data, or displaying the characters in a frame having a balloon shape in Step S33. In addition, in order for the display mode to be different from those of other characters, changing of the character font, setting or changing of the background color of characters, or changing of outline characters may be performed. In this manner, for example, it is possible for the characters corresponding to the voice to stand out and to provide the information related to the voice so as to be easily seen by the user using the characters. It is possible to display the characters corresponding to the voice and other characters in display modes different from each other so as to be seen by the user. Therefore, it is possible to provide various kinds of information by displaying characters and making it possible for the information to stand out.

In addition, since the additional data display control unit 166 specifies the kind of language of the voice detected by the microphone 63 and allows the image display unit 20 to display characters of the specified language, it is possible to provide information using characters of the language which is the same as that of the voice. Further, the additional data display control unit 166 may allow the image display unit 20 to display characters of the specified language and characters of a predetermined language. In this case, it is possible to provide specific information in multiple languages by displaying characters of the set language together with a character string of the language of the detected voice.

Moreover, in the head mounted display device 100, the additional data display control unit 166 may function as a language converting unit that converts characters included in the data acquired by the data acquisition unit DA to characters of a language to be displayed. In this case, the characters of a language different from the language to be displayed are converted and then displayed. For this reason, it is possible to provide information for the user even in a case where data including characters of multiple languages is acquired. Further, the head mounted display device 100 may perform voice recognition of the voice detected by the microphone 63 and output character data of the recognition result. In addition, the head mounted display device 100 may include the camera 61 that images the visual line direction, detects an image of a speaking person from the captured image of the camera 61, and detects the voice of the speaking person based on the detected image. In this case, the voice can be detected without using the microphone 63. In addition, the person who uttered the voice can be specified using the image.

Further, the invention is not limited to the configurations of the above-described embodiment and various modifications are possibly performed in the range without departing from the scope of the invention.

For example, in the above-described embodiment, the example in which the voice corresponding character strings 301 to 304 are displayed as a planar image has been described, but a part or the entire character strings may be displayed as a stereoscopic image. In this case, the additional data display control unit 166 may perform a process of determining whether to display the display data (character string) as a stereoscopic image or a planar image as the display attributes.

In addition, in place of the image display unit 20, an image display unit having another system such as an image display unit to be mounted on the head of the user, for example, a cap or the like may be employed as an image display unit and may include a display unit that displays an image corresponding to the left eye of the user and a display unit that displays an image corresponding to the right eye of the user. In addition, the display device according to the invention may be configured as a head mounted display to be installed in a vehicle such as an automobile or an airplane. In addition, for example, the display device may be configured as a head mounted display built in a body-protecting tool such as a helmet or a head-up display (HUD) used for front glass of an automobile.

In addition, in the above-described embodiment, the example of the configuration in which the image display unit 20 and the control device 10 are separated from each other and connected to each other through the connecting unit 40 has been described, but a configuration in which the control device 10 and the image display unit 20 are integrated with each other and mounted on the head of the user can be employed.

In addition, the control device 10 and the image display unit 20 are connected to each other through a longer cable or a wireless communication line and a mobile electronic device including a laptop computer, a tablet computer, a desktop computer, a game machine, a mobile phone, a smartphone, or a portable media player; or a dedicated device may be used as the control device 10.

In addition, for example, as a configuration of generating image light in the image display unit 20, a configuration that includes an organic electroluminescence (EL) display and an organic EL control unit may be employed and liquid crystal on silicon (LCoS; registered trademark), a digital micromirror device or the like can be used. Further, for example, the invention can be applied to a laser retina projection type head mounted display. That is, a configuration of allowing the user to visually recognize an image in a manner in which the image generation unit includes a laser light source and an optical system that guides the laser light source to the eyes of the user, the laser light is incident to the eyes of the user to scan the retinas, and an image is formed on the retinas may be employed. In a case where a laser retina projection type head mounted display is employed, the expression "a region in which image light in an image light generation unit can be emitted" can be defined as an image region to be visually recognized by the eyes of the user.

As an optical system that guides image light to the eyes of the user, a configuration that includes an optical member through which external light incident toward a device from the outside is transmitted and allows the image light and the external light to be incident to the eyes of the user can be employed. Further, an optical member that is positioned on the front side of the eyes of the user and overlapped with a part or the entire visual field of the user may be used. In addition, a scanning type optical system of scanning laser light or the like to be used as image light may be employed. Further, the optical system is not limited to an optical system of guiding image light in the inside of the optical member, and an optical system that has only a function of guiding image light toward the eyes of the user by refracting and/or reflecting the image light may be employed.

Moreover, the invention may be applied to a display device to which a scanning optical system using an MEMS mirror is employed and which uses an MEMS display technique. That is, as image display elements, the display device may include a signal light forming unit, a scanning optical system having an MEMS mirror that scans light emitted by the signal light forming unit, and an optical member on which a virtual image is formed due to light scanned by the scanning optical system. In this configuration, the light emitted by the signal light forming unit is reflected on the MEMS mirror to be incident on the optical member, guided through the optical member, and reaches a surface on which a virtual image is formed. A virtual image is formed on the surface on which a virtual image is formed by scanning the light using the MEMS mirror and an image is visually recognized by the user capturing the virtual image with the eyes. An optical component in this case may be a component that guides light after performing reflection plural times such as the right light guide plate 261 and the left light guide plate 262 according to the above described embodiment or a half mirror surface may be used.

In addition, the display device according to the invention is not limited to a head mounted display device and various display devices such as a flat panel display and a projector can by employed. The display device according to the invention may be a device that allows a user to visually recognize an image using external light and image light and a device having a configuration in which an image is visually recognized by the user due to an optical member through which the external light is transmitted using the image light can be exemplified. Specifically, the invention can be applied to a display device that projects image light on a transmissive flat surface or curved surface (glass or transparent plastic) which is fixedly or movably arranged on a position separated from the user in addition to the configuration including an optical member through which the external light is transmitted in the above-described head mounted display. As an example, a configuration of a display device that allows a user riding on a vehicle or a user outside the vehicle to visually recognize the scenery, other than the vehicle, together with an image due to image light by projecting the image light on window glass of the vehicle can be exemplified. Further, a configuration of a display device that allows a user present in the vicinity of a display surface to visually recognize the scenery through the display surface together with an image due to image light by projecting the image light on a transparent, semitransparent, or colored transparent display surface fixedly arranged such as window glass of a building can be exemplified.

Further, a configuration in which at least a part of each functional block illustrated in FIG. 2 may be realized in hardware or realized in cooperation of hardware and software may be employed. In addition, the configuration is not limited to a configuration in which independent hardware resources are arranged as illustrated in FIG. 2. In addition, a program executed by the control unit 140 may be stored in the memory unit 120 or a memory unit in the control device 10 or may be executed by acquiring a program stored in an external device through the communication unit 117 or the interface 180. In addition, only the operation unit 135 may be formed as a single user interface (UI) in a configuration formed in the control device 10 or the power supply 130 in the present embodiment may be singly formed and exchangeable. In addition, the configuration formed in the control device 10 may be repeatedly formed in the image display unit 20. For example, the control unit 140 illustrated in FIG. 2 may be formed in both of the control device 10 and the image display unit 20 or functions of the control unit 140 formed in the control device 10 and the CPU formed in the image display unit 20 may be separately divided.

The entire disclosure of Japanese Patent Application No. 2014-156645, filed Jul. 31, 2014 is expressly incorporated by reference herein.

What is claimed is:

1. An optically-transmissive display device, comprising:
    a display that allows a user to visually recognize an image and through which outside scenery is transmitted;
    a camera that captures the image;
    a 9-axis sensor that detects acceleration, angular velocity and terrestrial magnetism of the optically-transmissive display device to determine a visual line direction of a user; and
    a controller that detects a motion of a speaking person in the image, determines a content uttered by the speaking person from the motion, controls the display to display the image modified to include text of the content uttered by the speaking person, detects a distance from the optically-transmissive display device to the speaking person, and changes a mode of display wherein the controller controls the display to display an image: (1) in a different position relative to a part of the outside scenery visually recognized through the display, and (2) change a size of the text, depending on whether the detected distance is less than or greater than a predetermined distance.

2. The display device according to claim 1, wherein the controller acquires information related to the outside scenery visually recognized through the display and controls the display to display an image according to the acquired information.

3. The display device according to claim 2, wherein the controller acquires information related to the outside scenery visually recognized through the display based on a voice detected by a microphone.

4. The display device according to claim 3, further comprising an interface that acquires data from an external device, wherein the controller detects an image of a speaking person from the captured image of the camera, extracts the voice of the speaking person from the voices detected by the microphone based on the detected image, and controls the display to display an image based on the extracted voice and the data acquired by the interface.

5. The display device according to claim 4, wherein the controller controls the display to display the data acquired by the interface in a display mode corresponding to the voice detected by the microphone.

6. The display device according to claim 4, wherein the controller controls the display to display data corresponding to the voice detected by the microphone from among data acquired by the interface.

7. The display device according to claim 4, wherein the controller controls the display to display characters based on the data acquired by the interface.

8. The display device according to claim 3, wherein the characters corresponding to the voice detected by the microphone are displayed in a mode which is different from other characters.

9. The display device according to claim 3, wherein the controller specifies a kind of language of the voice detected by the microphone and controls the display to display characters of the specified language.

10. The display device according to claim 9, wherein the controller controls the display to display the characters of the specified language and characters of a set language.

11. The display device according to claim 5, wherein the controller converts characters included in the data acquired by the interface to characters of a language to be displayed.

12. The display device according to claim 3, wherein character data of recognition results is output by performing voice recognition of the voice detected by the microphone.

13. A method of controlling an optically-transmissive display device which includes a display through which outside scenery is transmitted and that displays an image so as to be visually recognized together with the outside scenery, the method comprising:
    capturing the image with a camera;
    detecting acceleration, angular velocity and terrestrial magnetism of the optically-transmissive display device with a 9-axis sensor to determine a visual line direction of a user;
    detecting a motion of a speaking person in the image, determining a content uttered by the speaking person from the motion, and controlling the display to display the image modified to include text of the content uttered by the speaking person;
    detecting a distance from the optically-transmissive display device to the speaking person; and
    changing a mode of display by controlling the display to display an image: (1) in a different position relative to a part of the outside scenery visually recognized through the display, and (2) change a size of the text, depending on whether the detected distance is less than or greater than a predetermined distance.

14. A non-transitory computer-readable medium storing a program which can be executed by a computer controlling an optically-transmissive display device which includes a display through which outside scenery is transmitted and that displays an image so as to be visually recognized together with the outside scenery, the program causing the computer to function as:

a controller that detects a motion of a speaking person in the image, causes a 9-axis sensor in the display device to detect acceleration, angular velocity and terrestrial magnetism of the optically-transmissive display device to determine a visual line direction of a user, determines a content uttered by the speaking person from the motion, controls the display to display the image modified to include text of the content uttered by the speaking person, detects a distance from the optically-transmissive display device to the speaking person, and changes a mode of display wherein the controller controls the display to display an image: (1) in a different position relative to a part of the outside scenery visually recognized through the display, and (2) change a size of the text, depending on whether the detected distance is less than or greater than a predetermined distance.

* * * * *